US012694703B2

(12) United States Patent

Xu

(10) Patent No.: US 12,694,703 B2

(45) Date of Patent: Jul. 28, 2026

(54) METHOD AND APPARATUS EMPLOYING CONTEXT-AWARE OPTICAL CHARACTER RECOGNITION TO EXTRACT FORM INFORMATION

(71) Applicant: KONICA MINOLTA BUSINESS SOLUTIONS U.S.A., INC., Foster City, CA (US)

(72) Inventor: Ting Xu, Campbell, CA (US)

(73) Assignee: KONICA MINOLTA BUSINESS SOLUTIONS U.S.A., INC., Foster City, CA (US)

( * ) Notice: Subject to any disclaimer, the term of this patent is extended or adjusted under 35 U.S.C. 154(b) by 398 days.

(21) Appl. No.: 18/405,723

(22) Filed: Jan. 5, 2024

(65) Prior Publication Data

US 2025/0225807 A1 Jul. 10, 2025

(51) Int. Cl.
| | |
|---|---|
| *G06V 30/262* | (2022.01) |
| *G06V 10/82* | (2022.01) |
| *G06V 30/14* | (2022.01) |
| *G06V 30/148* | (2022.01) |
| *G06V 30/19* | (2022.01) |

(52) U.S. Cl.
CPC ............ *G06V 30/274* (2022.01); *G06V 10/82* (2022.01); *G06V 30/1448* (2022.01); *G06V 30/153* (2022.01); *G06V 30/19147* (2022.01); *G06V 30/19173* (2022.01)

(58) Field of Classification Search
CPC .. G06V 30/274; G06V 10/82; G06V 30/1448; G06V 30/153; G06V 30/19147; G06V 30/19173; G06V 30/10
See application file for complete search history.

(56) References Cited

U.S. PATENT DOCUMENTS

| | | | | |
|---|---|---|---|---|
| 8,755,595 | B1 * | 6/2014 | Bissacco | G06F 18/214 |
| | | | | 382/159 |
| 9,082,035 | B2 | 7/2015 | Hwang et al. | |
| 9,996,890 | B1 * | 6/2018 | Cinnamon | G06V 10/764 |
| 11,443,553 | B1 * | 9/2022 | Liu | G06V 10/762 |
| 11,763,585 | B2 * | 9/2023 | Mukherjee | G06F 18/214 |
| | | | | 382/157 |
| 11,775,617 | B1 * | 10/2023 | Jaiswal | G06V 10/454 |
| 12,045,288 | B1 * | 7/2024 | Barut | G06N 3/044 |
| 12,417,214 | B1 * | 9/2025 | Zhang | G06F 40/205 |
| 12,482,255 | B1 * | 11/2025 | Azad | G06N 3/08 |

(Continued)

FOREIGN PATENT DOCUMENTS

| | | | | |
|---|---|---|---|---|
| CN | 110866501 A | 3/2020 | | |
| JP | 6138305 B2 | 5/2017 | | |
| WO | WO-2021169363 A1 * | 9/2021 | | G06F 18/214 |

OTHER PUBLICATIONS

Ekraam Sabir et al., "Implicit Language Model in LSTM for OCR", May 23, 2018.

*Primary Examiner* — Mia M Thomas
(74) *Attorney, Agent, or Firm* — SQUIRE PATTON BOGGS (US) LLP

(57) ABSTRACT

Method and apparatus for context-aware character recognition, using surrounding materials from ambiguous characters to identify the ambiguous characters correctly. There is better optical character recognition (OCR) accuracy for intrinsically confusing characters, printed or handwritten, and increased information extraction accuracy for scanned forms, including forms filled out by hand.

20 Claims, 6 Drawing Sheets

(56)                    References Cited

U.S. PATENT DOCUMENTS

| | | | |
|---|---|---|---|
| 12,526,253 B1 * | 1/2026 | Gutierrez Keever ........................ H04L 51/216 |
| 12,555,008 B1 * | 2/2026 | Singh ........................ G06N 5/04 |
| 2020/0082218 A1 * | 3/2020 | Hoehne ................ G06V 30/413 |
| 2020/0151443 A1 * | 5/2020 | Florencio ............. G06V 30/268 |
| 2020/0285788 A1 * | 9/2020 | Brebner ................ G06F 18/251 |
| 2021/0073530 A1 * | 3/2021 | Schaefer ................. G06T 11/26 |
| 2021/0073566 A1 * | 3/2021 | Hoehne ................ G06V 30/166 |
| 2022/0405524 A1 * | 12/2022 | Yuan .................... G06N 3/0455 |
| 2022/0415320 A1 * | 12/2022 | Zheng .................. G06F 40/237 |
| 2023/0281247 A1 * | 9/2023 | Lee ........................ G06F 16/732 |
| 2023/0306056 A1 * | 9/2023 | Lee ........................ G06V 20/49 |
| 2024/0062569 A1 * | 2/2024 | Mittal .................... G06V 10/82 |
| 2024/0112483 A1 * | 4/2024 | Wei ....................... G06V 30/414 |
| 2024/0386015 A1 * | 11/2024 | Crabtree ............. G06F 16/9024 |
| 2025/0322762 A1 * | 10/2025 | Chokshi ................. G06V 30/10 |
| 2025/0335876 A1 * | 10/2025 | Light ................. G06Q 10/1053 |

* cited by examiner

Date

Node Layer 1 (Input)

Node Layer 2

620-2

Node Weighting    610

620-N-1

Node Layer N-1

Node Layer N (Output)

620-N

Database    650

CPU Memory    720

CPU    710

500, 550

GPU Memory    740

GPU    730

Non-Volatile Storage    750

METHOD AND APPARATUS EMPLOYING CONTEXT-AWARE OPTICAL CHARACTER RECOGNITION TO EXTRACT FORM INFORMATION

FIELD OF THE INVENTION

Aspects of the present invention relate to character recognition, not limited to handwriting recognition, and more particularly to optical character recognition (OCR). More particularly, aspects of the present invention relate to context-aware character recognition. Still more particularly, aspects of the present invention relate to extraction of information from forms employing context-aware OCR.

BACKGROUND OF THE INVENTION

In character recognition generally, depending on the way that characters are generated (handwritten, typed), on the font(s) used, on the quality of the paper on which the characters appear, and on the quality with which text containing the characters are input, sequences of characters can look quite similar to each other. As a result, OCR output by itself can be accurate to varying degrees. In some cases, the OCR output may be nonsensical. Accuracy can be a matter of more than just correct character interpretation. Some characters may look similar when they are separate, or when they are put together to form another character, as for example in certain Japanese characters. Different similarly-appearing characters may mean substantially the same thing, but may have different connotations because the characters come from different historical periods. Still further, different similarly-appearing character sequences can mean completely different things depending on the context.

It would be helpful to provide context-aware interpretation of letter or character sequences, to augment interpretation based solely on letter or character appearance.

SUMMARY OF THE INVENTION

Advantages of aspects of the invention include, but are not limited to:

Better OCR accuracy for intrinsically confusing characters, printed or handwritten;

Increased information extraction accuracy for scanned forms, including forms filled out by hand;

Fine tuning of the OCR engine, which in an embodiment may comprise one or more of convolutional neural networks (CNN), recurrent neural networks (RNN), including long short-term memory or bi-directional long short-term memory (LSTM or Bi-LSTM) systems, and combinations of CNN and RNN (convolutional recurrent neural networks (CRNN)) on images that contains both context and content, instead of just fragmented text;

Enabling the CRNN to learn an implicit language model of key-value pairs in the LSTM;

Semantic region segmentation for stitching related text bounding boxes;

Ability to search related keywords based on text box location;

Two stages of OCR: a first stage for all detected text boxes (horizontally merged); and a second sage to recognize new images stitched from keyword and content text boxes.

BRIEF DESCRIPTION OF THE DRAWINGS

FIGS. 1A-1G depict various kinds of characters;

FIGS. 2A-2C depict various kinds of characters in context;

DETAILED DESCRIPTION

Figure 3:
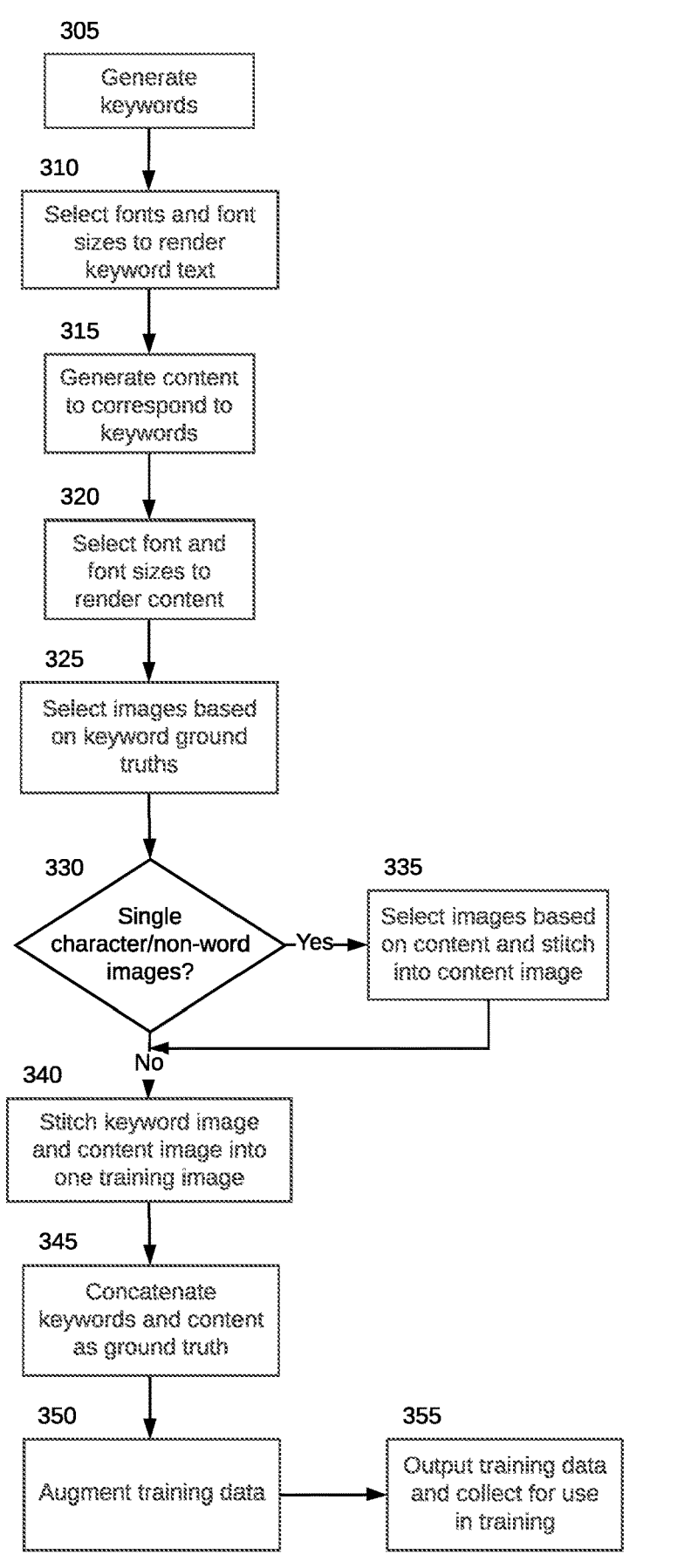
FIG. 3 is a high level flow chart according to an embodiment.

One aspect of the present invention relates to training of a neural network based model such that further inputs to the model do not skew the weights which are developed within the model, thereby preserving model accuracy.

In an embodiment, the neural network based model may be selected from the group consisting of: a convolutional neural network (CNN), recurrent neural networks (RNN), including long short-term memory or bi-directional long short-term memory (LSTM or Bi-LSTM), and combinations of CNN and RNN (convolutional recurrent neural networks (CRNN)); and a CNN in combination with a transformer neural network (CNN+transformer).

In an embodiment, the CRNN may be trained using connectionist temporal classification (CTC) loss calculation. In an embodiment, the CNN+transformer may be trained using cross-entropy loss calculation.

FIGS. 1A-1G provide some non-limiting examples of visually similar characters. In FIG. 1A, a Japanese character (for example, hiragana or katakana) may have a voicing mark next to it. The first character in FIG. 1A has no such mark. The second character has a handakuten (half-voicing) mark, which appears as a circle. The third character has a dakuten (voicing) mark, which appears as dots. Each of these marks will cause the associated character to be pronounced differently.

Each of FIGS. 1B-1D contains three characters, each one slightly different from the other two, and having different meaning, and different pronunciation. FIG. 1E has a two-part character on the left hand side, and two different characters on the right hand side. Pronunciation and meaning for these different characters in FIG. 1E will be different.

FIG. 1F has a Kanji character on the left hand side, and a numeral with a Kanji character on the right hand side. These different characters will have different meanings. FIG. 1G presents a yet further complication, in that the character on the left is katakana, and the character on the right is Kanji.

Looking at the characters in each of these figures in the context of other characters or text can be helpful in discerning correct pronunciations and meanings. However, where the characters are somehow not clear (e.g. are smudged or blurred), or are handwritten, or even have different fonts, it may be difficult or impossible to interpret the characters correctly, even in the context of other characters or text in a line of text. More context may be necessary.

While FIGS. 1A-1G show Japanese and Chinese characters, ambiguities exist in all alphabets. For example, in the Latin alphabet and Arabic numerals, the number 1, the letter lowercase l, and the capital I all look similar. Zero and lower and uppercase o/O also can look similar, and can be mistaken for each other. 6 and G, and S and 5 also are confusing in some situations. Combinations of Arabic numerals and Japanese characters, e.g. 2 and コ, can be confusing. Combinations in acronyms, such as region of interest (ROI) and R01, likewise are confusing.

Figures 2A, 2B, 2C:
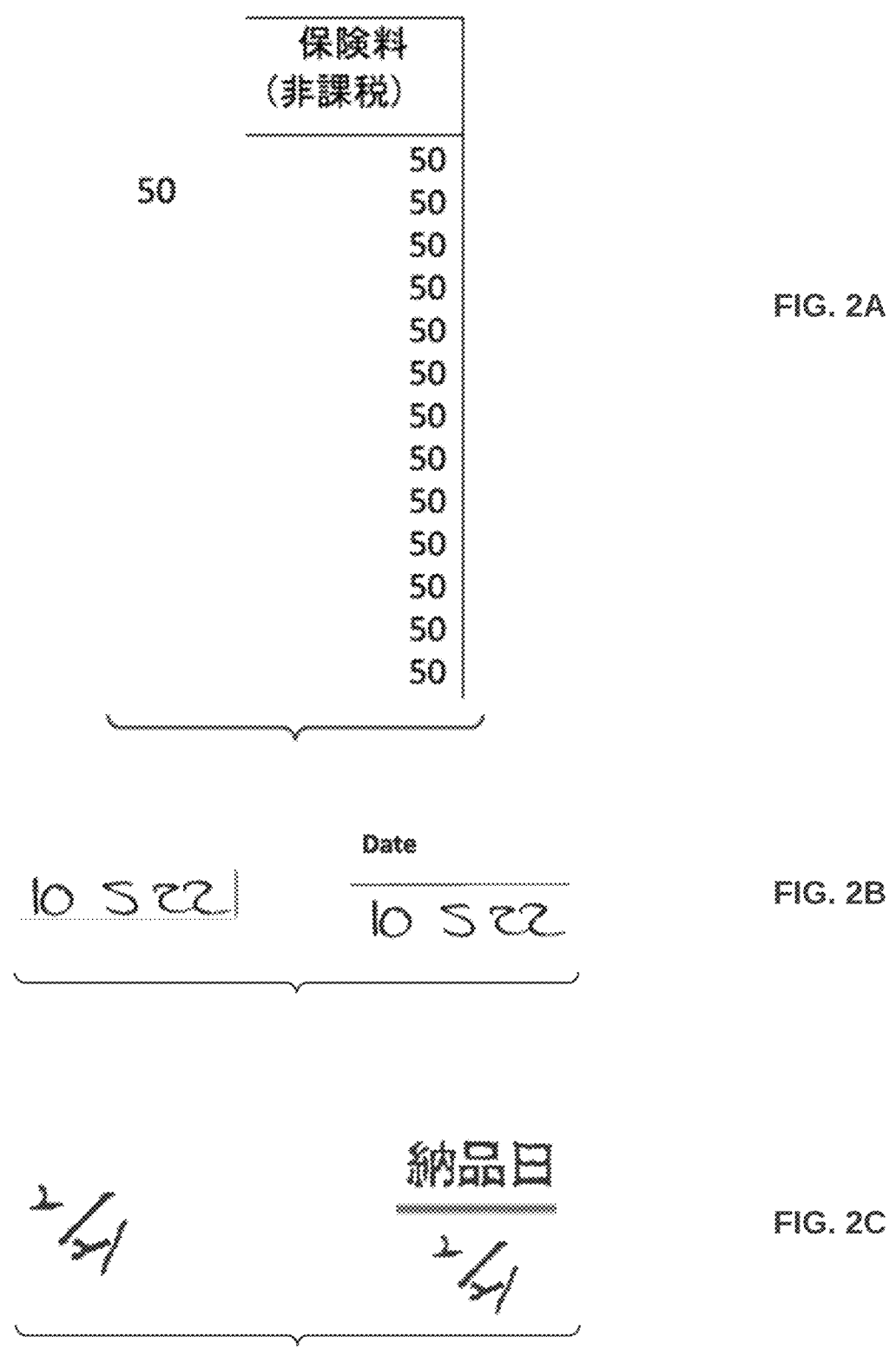

FIGS. 2A-2C provide examples of the further context that can help to interpret characters or text. In FIG. 2A, the characters on the left hand side could be the number 50, or the word SO (uppercase or lowercase), or a combination of letters and numbers. On the right hand side of FIG. 2A, the provision of a list of characters underneath a header, and/or as cells in a table, can give rise to the inference that the characters are the number 50. In FIG. 2B, the handwritten characters may be difficult for an OCR engine to decipher. These characters could be a single five-digit number, or a two-digit number and a three-digit number, or a three-digit number and a two-digit number, or three different numbers (two two-digit numbers and a single-digit number). However, the provision of the numbers under the header "Date" can give rise to the inference that a date in month-day-year or day-month-year format is intended. Further context may be provided by knowing that the date format is European (month first) or American (day first), or training the neural network model that the first number is the month and the second is the day (for the European format, for example).

In FIG. 2C, the handwritten characters on the left-hand side could be literally anything from an attempt at writing Japanese or Chinese characters, or a number. The header on the right-hand side can give rise to the inference that a month and day are intended. The characters could be interpreted as a date, e.g. 2/21. The handwritten 21 also could be interpreted as a 4. This difference in interpretation may be difficult to address just with training data. For example, if the characters are supposed to be a date, and particularly the number 21, obtaining training samples that look like a 4 but telling the system that the samples really should be interpreted as 21 can adversely affect the weights in the neural network model being used, and diminish the model's accuracy.

For a neural network model like the ones mentioned above, there are two primary tasks. One is to collect data— handwritten samples, printed sample, characters and/or words in tables—to generate a sufficient number of synthetic training samples. Different handwriting styles, different fonts, different appearances (boldface, italic, underlined, etc.) may be employed. A second primary task is to render training samples with sufficient variation. In embodiments, three different primary types of data may be collected, and expanded upon to generate the training sets. For form information extraction, a first type of data is key words and/or phrases appearing in forms. For example, for invoices, header data such as "quantity," "unit price," "description," "model number," "part number," and the like may be useful. This header data may be primarily textual in nature. A second type of data comprises handwritten text, which could be single or multiple characters, and/or multiple words. For such handwritten text, ground truth data would be needed. A third type of data may comprise fonts.

To generate training samples, the following steps may be followed as set forth in FIG. 3. In an embodiment, there may be an assumption that for forms and formatted documents with tables and the like, keywords (e.g. headers) are always printed.

Looking now at FIG. 3, at 305 keywords may be generated, for example, as headers or other parts of forms. At 310 a random font selection may be made, with both font types and font sizes selected to render keyword text and generate artificial data. At 315, content may be generated to correspond to the keywords. A utility such as Faker might be used to generate this content. Thus, for example, for an invoice header for "quantity" or for "unit price" or for "total," numbers for quantity, and numbers and currency symbols for "unit price" or "total" may be provided in cells or rows beneath the header. In an embodiment in which an invoice has headers on the left hand side of the form instead of at the top, the keywords may be on the left hand side, and the content to the right. At 320, fonts and font sizes may be selected to render the content.

In some embodiments, training data for text, including handwritten text may be generated, with corresponding ground truths. The training data can take various forms, from single characters, to words, to numbers, to lines of text. The text training data may be useful in situations in which forms with printed keywords are filled out by hand. Accordingly, at 325 images may be selected for training data, based on keyword ground truths. Again, the data can include handwritten data. At 330, the images are reviewed more closely to see how many characters they are—that is, are they single characters, or words, or phrases, or sentences, or something else. At 335, if the images are single characters or letter combinations that are not necessarily words, the images may be selected based on content, and stitched together into a content image. For example, a date, a quantity, or a price, including handwritten versions, may be selected here.

At 340, irrespective of whether the content is handwritten, the keyword image and its corresponding content image are stitched together into a single training image. At 345, keywords and content are concatenated, or linked together, as a corresponding ground truth. At 350, the training data may be augmented as desired to make still further training data. Depending on the embodiment, augmenting may include one or more of background shading, underlining, boldface, italicizing, or some kind of noise application. Ordinarily skilled artisans will appreciate that many different types of augmentation are possible. Finally, at 355, the training data may be output and collected for use in training a system.

As noted earlier, one significant aspect of training a system like this is that, when the system itself is in operation, processing and performing character recognition on input data, the results of that character recognition do not force the system to change node weights. In particular, it would be preferable in some instances not to force the system to recognize characters in a particular way. Such forcing could result in node weight changes that would yield decreased accuracy, rather than increased accuracy. A better approach would be to provide more context where possible.

Figure 4:
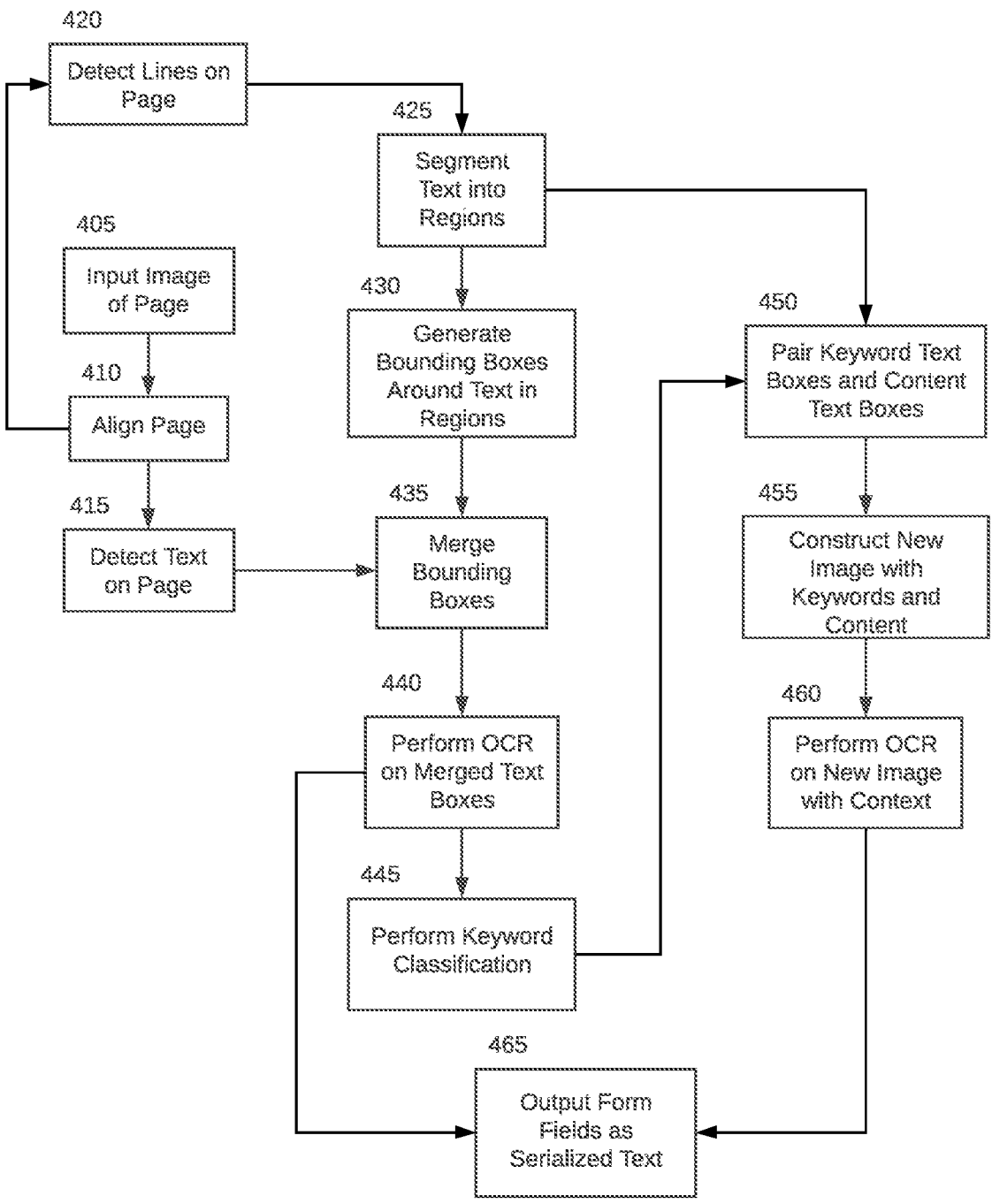
FIG. 4 is a high level flow chart according to an embodiment.

FIG. 4 shows flow for outputting fields of forms, with keywords and/or content, as serialized text. In an embodiment, at 405 an image of a page is input (e.g. scanned in). At 410, the page is oriented, whether through alignment, de-skewing, resizing, noise removal, other correction, or some combination of all of these. In an embodiment, page orientation may be carried out in multiples of 90 degrees (either clockwise or counterclockwise), to make the text appear upright on the page. At 415, after alignment, text may be detected on the page. At 420, also after alignment, ruling lines, table borders, and the like may be detected on the page. The ruling lines and table borders define areas of text, whether keywords or content. This detection may be useful to enable segmentation of an input page into regions of related text. In an embodiment, such detection of ruling lines and table borders may be effected by semantic segmentation, which can distinguish text and ruling lines. In an embodiment, post-processing including image binarization and connected component analysis can generate text bounding boxes, as in 430. In an embodiment, a semantic segmentation model may be trained to ignore logos and barcodes as being neither text nor ruling lines. As just alluded to, ruling lines combined with other geometry information can help group related texts into regions.

At 425, the detected text is segmented into regions, based on the detected lines and/or borders. Without those lines or borders, segmentation can become a more difficult problem, because the lines and/or borders denote groupings of characters. For languages such as Chinese or Japanese, there may be different sizes of spaces between characters or words. Different combinations of characters can yield different words or expressions. For combinations of, for example, numbers and characters, as in FIG. 1F, there can be different spaces between the numbers and the characters, also yielding different combinations, such as acronyms, or words. As an example, "ROI" for "region of interest" may show up on a page as R01. If all three characters (two numbers and a letter) are together, the combination may be interpreted as ROI, given sufficient context. If there is a space between the R and the 01, a different interpretation may result, again perhaps depending on context.

After segmentation, two actions may occur. At 430, text boxes or bounding boxes may be updated as part of the OCR process. At 450, keyword text boxes and content text boxes may be paired. Lining up columns of text (keywords and content)—concatenation of the keywords and content—is important. Left or right justification, centering, no justification, of both keywords and content can be important because that alignment can facilitate concatenation of keywords and content.

At 435, bounding boxes (text boxes, ruling lines, table borders, and the like) may be merged. In an embodiment, flow to 435 may come from 430, as just discussed, or from 415, text detection on the input page. At 440, OCR may be performed on the merged boxes. At 445, keyword classification may be performed. This keyword classification feeds into 450, discussed earlier to provide the keyword text boxes which are paired with the content text boxes.

At 455, a new image with keywords and content—in an embodiment, a new form with headers and data corresponding to the headers—may be constructed. At 460, then, OCR may be performed on the new form. At 465, form fields may be output as serialized text, coming not just from 460, but also from 440. This serialized text may be used for further application-dependent processing such as searching, summarizing, and archiving.

Figure 5:
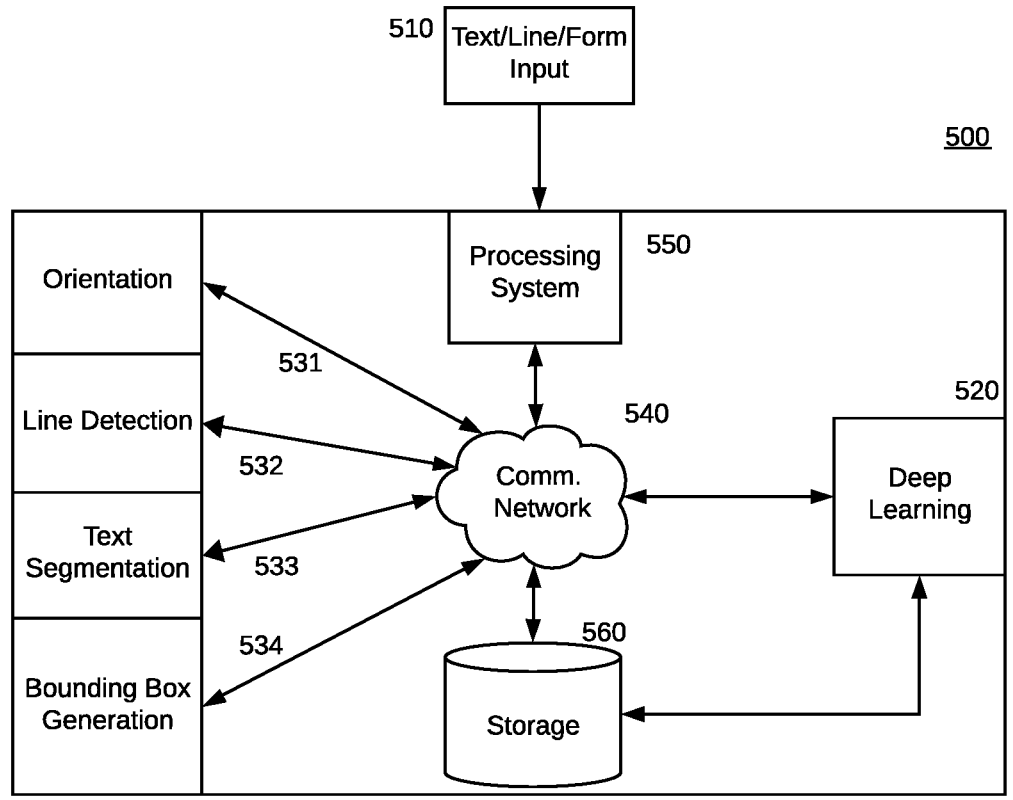
FIG. 5 is a high level block diagram according to an embodiment.

FIG. 5 is a high level block diagram of a computing system 500 which may implement a deep learning system 520, trained on known data as discussed above. Depending on the embodiment, text input 510 may comprise a library of text strings of different known lengths and different known characteristics. In an embodiment, text, line, and/or form input 510 may come from any number of sources, including not only "live" sources such as scanners, cameras, or other imaging equipment which can provide images of known text sequences, but also "canned" sources such as libraries. In an embodiment, "live" sources as part of text, line, and/or form input 510 also may handle text to be processed for electronic documents.

Processing system 550 may be a separate system, or it may be part of text, line, and/or form input 510, or may be part of deep learning system 520, depending on the embodiment. Processing system 550 may include one or more processors, one or more storage devices, and one or more solid-state memory systems (which are different from the storage devices, and which may include both non-transitory and transitory memory).

In an embodiment, processing system 550 may include deep learning system 520 or may work with deep learning system 520 to facilitate text orientation in block 531, or line detection in block 532, or text segmentation in block 533, or bounding box generation in block 534, in accordance with the various stages discussed above with respect to FIG. 4. In some embodiments, one or more text orientation in block 531, or line detection in block 532, or text segmentation in block 533, or bounding box generation in block 534, may implement its own deep learning system 520. In embodiments, each of blocks 531, 532, 533, or 534 may include one or more processors, one or more storage devices, and one or more solid-state memory systems (which are different from the storage devices, and which may include both non-transitory and transitory memory). In embodiments, additional storage 560 may be accessible to one or more of text orientation in block 531, or line detection in block 532, or text segmentation in block 533, or bounding box generation in block 534, and processing system 550 over a communications network 540, which may be a wired or a wireless network or, in an embodiment, the cloud.

In an embodiment, storage 560 may contain training data for the one or more deep learning systems in one or more of blocks 520, 531, 532, 533, 534, or 550. Storage 560 may store text, lines, and/or forms from input 510.

Where communications network 540 is a cloud system for communication, one or more portions of computing system 500 may be remote from other portions. In an embodiment, even where the various elements are co-located, network 540 may be cloud-based.

Figure 6:
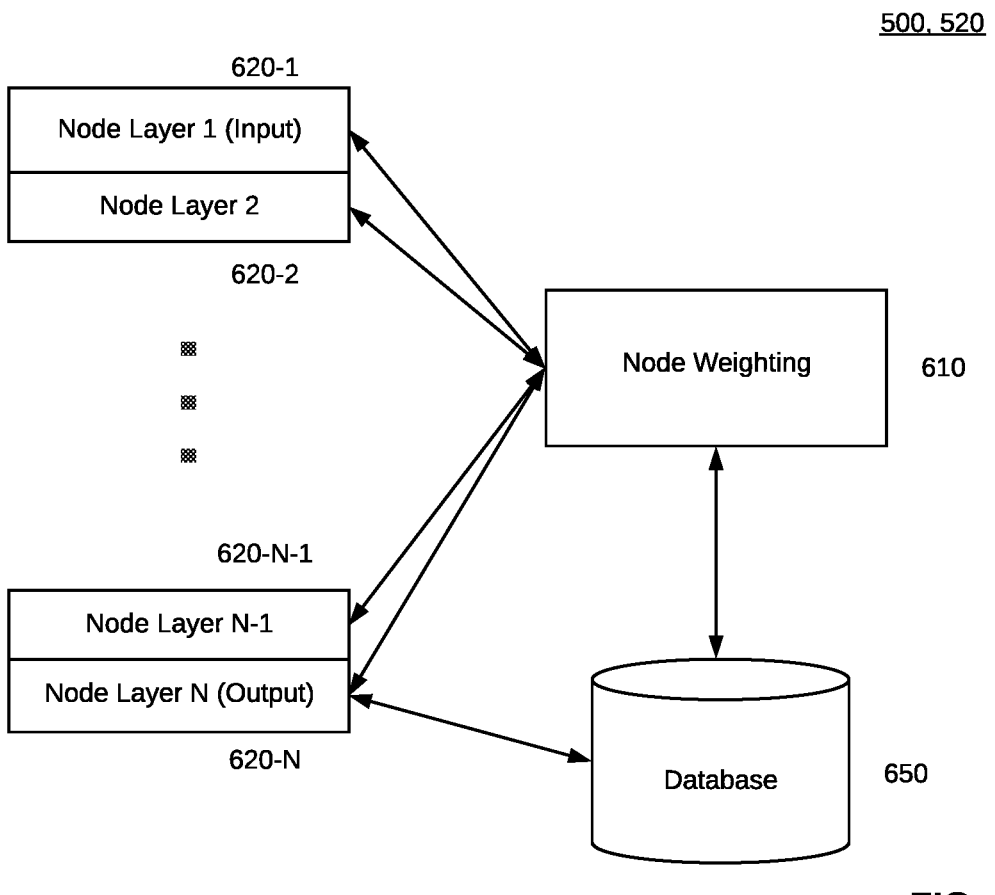
FIG. 6 is a high level block diagram of portions of FIG. 5 according to an embodiment.

FIG. 6 is a high level diagram of apparatus for weighting of nodes in a deep learning system according to an embodiment. As training of a deep learning system proceeds according to an embodiment, the various node layers 620-1, . . . , 620-N may communicate with node weighting module 610, which calculates weights for the various nodes, and with database 650, which stores weights and data. As node weighting module 610 calculates updated weights, these may be stored in database 650. This node weighting is part of deep learning system 520. As noted earlier, one or more of the blocks in computer system 500 may implement a deep learning system of its own, and hence may employ node weighting as in FIG. 6.

Figure 7:
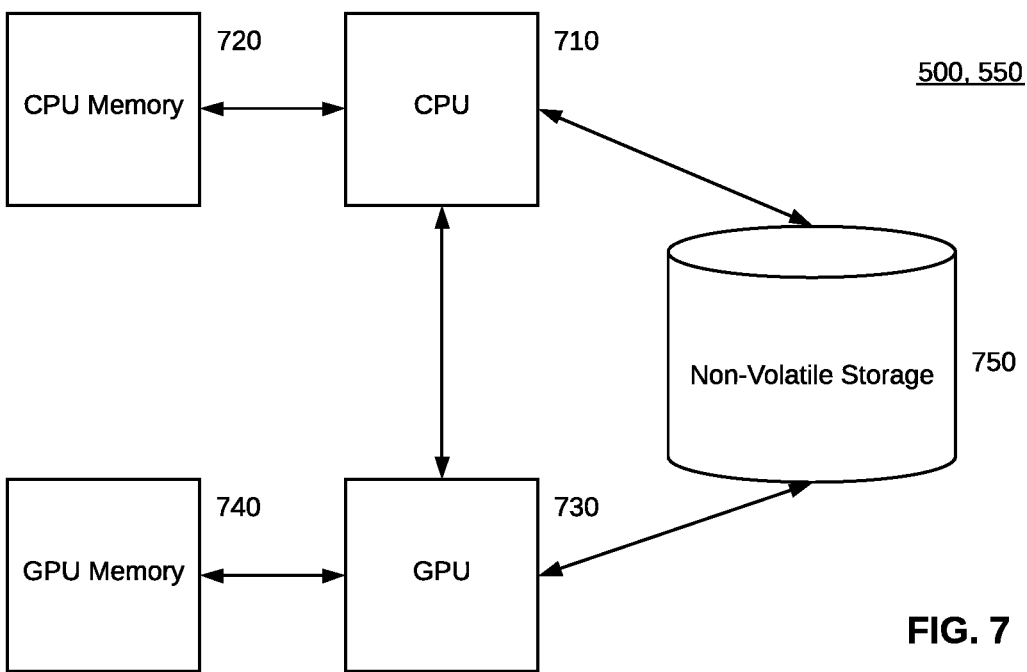
FIG. 7 is a high level block diagram of portions of FIG. 5 according to an embodiment.

FIG. 7 is a high level diagram of apparatus to operate a deep learning system according to an embodiment. In FIG. 7, one or more CPUs 710 may communicate with CPU memory 720 and non-volatile storage 750. One or more GPUs 730 may communicate with GPU memory 740 and non-volatile storage 750. Generally speaking, a CPU may be understood to have a certain number of cores, each with a certain capability and capacity. A GPU may be understood to have a larger number of cores, in many cases a substantially larger number of cores than a CPU. In an embodiment, each of the GPU cores may have a lower capability and capacity than that of the CPU cores, but may perform specialized functions in the deep learning system, enabling the system to operate more quickly than if CPU cores were being used.

While the foregoing describes embodiments according to aspects of the invention, the invention is not to be considered as limited to those embodiments or aspects. Ordinarily skilled artisans will appreciate variants of the invention within the scope and spirit of the appended claims.

What is claimed is:

1. A method comprising:

receiving a text-containing document into a deep learning system;

using the deep learning system, detecting lines in the text-containing document;

using the deep learning system, responsive to the detecting, segmenting text in the text-containing document into one or more regions;

using the deep learning system, identifying one or more keywords in each of the one or more regions;

using the deep learning system, responsive to the identifying of the one or more keywords, identifying content for each of the one or more keywords;

using the deep learning system, constructing a new image with the one or more keywords and the corresponding content; and using the deep learning system, responsive to the constructing, outputting form fields as serialized text.

2. The method of claim 1, further comprising, aligning the text-containing document so that text in the document appears upright.

3. The method of claim 1, further comprising orienting the text-containing document so that the text in the document appears in consistent lines.

4. The method of claim 1, further comprising performing optical character recognition (OCR) on the new image.

5. The method of claim 1, further comprising:

using the deep learning system, generating bounding boxes around segmented text in the one or more regions;

merging the bounding boxes;

using the deep learning system, performing OCR on the merged text boxes; and using the deep learning system, responsive to performing OCR, performing keyword classification.

6. The method of claim 5, further comprising:

responsive to keyword classification and to the segmenting, pairing keyword text boxes and content text boxes.

7. The method of claim 1, wherein the deep learning system is selected from the group consisting of convolutional neural networks (CNN), recurrent neural networks (RNN), including long short-term memory and bi-directional long short-term memory (LSTM and Bi-LSTM) systems, combinations of CNN and RNN (convolutional recurrent neural networks (CRNN)), and a CNN in combination with a transformer neural network.

8. The method of claim 1, further comprising training the CRNN using connectionist temporal classification (CTC) loss calculation, or training the CNN+transformer using cross-entropy loss calculation.

9. The method of claim 1, further comprising training the deep learning system by performing the following:

generating keywords;

generating content to correspond to the keywords;

selecting images for the content according to ground truths for the keywords;

stitching the content images together to form a single content image;

selecting images for the keywords;

stitching the keyword images to form a single keyword image; and stitching the single content image and the single keyword image together to form a single training image as training data.

10. The method of claim 9, wherein training the deep learning system further comprises augmenting the training data by applying one or more of background shading, underlining, boldface, italicizing, or noise.

11. An apparatus comprising:

a deep learning system comprising at least one processor and a non-transitory memory that contains instructions that, when executed, enable the deep learning system to perform a method comprising:

responsive to receipt of a text-containing document, detecting lines in the text-containing document;

responsive to the detecting, segmenting text in the text-containing document into one or more regions;

responsive to the segmenting, identifying one or more keywords in each of the one or more regions;

responsive to the identifying of the one or more keywords, identifying content for each of the one or more keywords;

constructing a new image with the one or more keywords and the corresponding content; and responsive to the constructing, outputting form fields as serialized text.

12. The apparatus of claim 11, wherein the method further comprises aligning the text-containing document so that text in the document appears upright.

13. The apparatus of claim 11, wherein the method further comprises orienting the text-containing document so that the text in the document appears in consistent lines.

14. The apparatus of claim 11, wherein the method further comprises performing optical character recognition (OCR) on the new image.

15. The apparatus of claim 11, wherein the method further comprises:

using the deep learning system, generating bounding boxes around segmented text in the one or more regions;

merging the bounding boxes;

using the deep learning system, performing OCR on the merged text boxes; and using the deep learning system, responsive to performing OCR, performing keyword classification.

16. The apparatus of claim 15, wherein the method further comprises:

using the deep learning system, responsive to keyword classification and to the segmenting, pairing keyword text boxes and content text boxes.

17. The apparatus of claim 11, wherein the deep learning system is selected from the group consisting of convolutional neural networks (CNN), recurrent neural networks (RNN), including long short-term memory and bi-directional long short-term memory (LSTM and Bi-LSTM) systems, combinations of CNN and RNN (convolutional recurrent neural networks (CRNN)), and a CNN in combination with a transformer neural network.

18. The apparatus of claim 11, further comprising training the CRNN using connectionist temporal classification (CTC) loss calculation, or training the CNN+transformer using cross-entropy loss calculation.

19. The apparatus of claim 11, further comprising training the deep learning system by performing the following:

generating keywords;

generating content to correspond to the keywords;

selecting images for the content according to ground truths for the keywords;

stitching the content images together to form a single content image;

selecting images for the keywords;

stitching the keyword images to form a single keyword image; and stitching the single content image and the single keyword image together to form a single training image as training data.

20. The apparatus of claim 19, wherein training the deep learning system further comprises augmenting the training data by applying one or more of background shading, underlining, boldface, italicizing, or noise.

\* \* \* \* \*